US007931850B2

(12) United States Patent
Menoni et al.

(10) Patent No.: US 7,931,850 B2
(45) Date of Patent: Apr. 26, 2011

(54) NANOMETER-SCALE ABLATION USING FOCUSED, COHERENT EXTREME ULTRAVIOLET/SOFT X-RAY LIGHT

(75) Inventors: Carmen S. Menoni, Fort Collins, CO (US); Jorge J. Rocca, Fort Collins, CO (US); Georgiy Vaschenko, San Diego, CA (US); Scott Bloom, Encinitas, CA (US); Erik H. Anderson, El Cerrito, CA (US); Weilun Chao, El Cerrito, CA (US); Oscar Hemberg, Stockholm (SE)

(73) Assignees: Colorado State University Research Foundation, Fort Collins, CO (US); The Regents of University of California, Oakland, CA (US); JMAR Technologies, Inc., San Diego, CA (US)

( * ) Notice: Subject to any disclaimer, the term of this patent is extended or adjusted under 35 U.S.C. 154(b) by 0 days.

(21) Appl. No.: 12/861,627

(22) Filed: Aug. 23, 2010

(65) Prior Publication Data

US 2011/0042353 A1 Feb. 24, 2011

Related U.S. Application Data

(62) Division of application No. 11/840,898, filed on Aug. 17, 2007.

(60) Provisional application No. 60/838,959, filed on Aug. 19, 2006.

(51) Int. Cl.
*B29C 67/00* (2006.01)
(52) U.S. Cl. ..................................... 264/400; 425/174.4
(58) Field of Classification Search .................. 264/400; 425/174.4
See application file for complete search history.

(56) References Cited

U.S. PATENT DOCUMENTS 5,444,211 A 8/1995 Nakata et al.
7,251,263 B2 7/2007 Rocca

OTHER PUBLICATIONS

U.S. Appl. No. 11/021,217, "Increased Laser Output Energy and Average Power at Wavelengths Below 35 nm," by Jorge J. Rocca et al., filed Dec. 23, 2004.
A. Weith et al., "Continuous high-repetition-rate operation of collisional soft x-ray lasers with solid targets," Optics Letters, pp. 1994-1996, vol. 31, No. 13, Jul. 1, 2006.
Y. Wang et al., "Demonstration of high-repetition-rate tabletop soft-x-ray lasers with saturated output down to 13.9 nm and gain down to 10.9 nm," Phys. Rev. A 72, 053807 (2005).
Y. Liu et al., "Achievement of essentially full spatial coherence in a high-average-power soft x-ray laser," Physical Review A, vol. 63, 033802 (2001).
Bloom et al., X-Ray Nanoplasma Instruments and Tools, May 10, 2005, SPIE vol. 5752, pp. 782-789.

(Continued)

*Primary Examiner* — Joseph S Del Sole
*Assistant Examiner* — James Sanders
(74) *Attorney, Agent, or Firm* — Samuel M. Freund; Cochran Freund & Young LLC

(57) ABSTRACT

Ablation of holes having diameters as small as 82 nm and having clean walls was obtained in a poly(methyl methacrylate) on a silicon substrate by focusing pulses from a Ne-like Ar, 46.9 nm wavelength, capillary-discharge laser using a freestanding Fresnel zone plate diffracting into third order is described. Spectroscopic analysis of light from the ablation has also been performed. These results demonstrate the use of focused coherent EUV/SXR light for the direct nanoscale patterning of materials.

10 Claims, 7 Drawing Sheets

OTHER PUBLICATIONS

Benware et al., Applications of a high repetition rate table top soft x-ray laser: laser ablation with a focused beam and reflectometry of materials, Jul. 1999, SPIE vol. 3776, pp. 204-211.

Juha et al., Ablation of PMMA, PTFE, and Si by soft x-rays emitted from hot dense plasma, 2002, SPIE vol. 4760, pp. 1098-1105.

Yun et al., Nanometer focusing of hard x rays by phase zone plates, May 1999, Review of Scientific Instruments vol. 70 No. 5, pp. 2238-2241.

Non-Final Office Action, U.S. Appl. No. 11/840,898, pp. 1-40.

Non-Final Office Action, U.S. Appl. No. 11/840,898, pp. 1-11.

Final Office Action, U.S. Appl. No. 11/840,898, pp. 1-14.

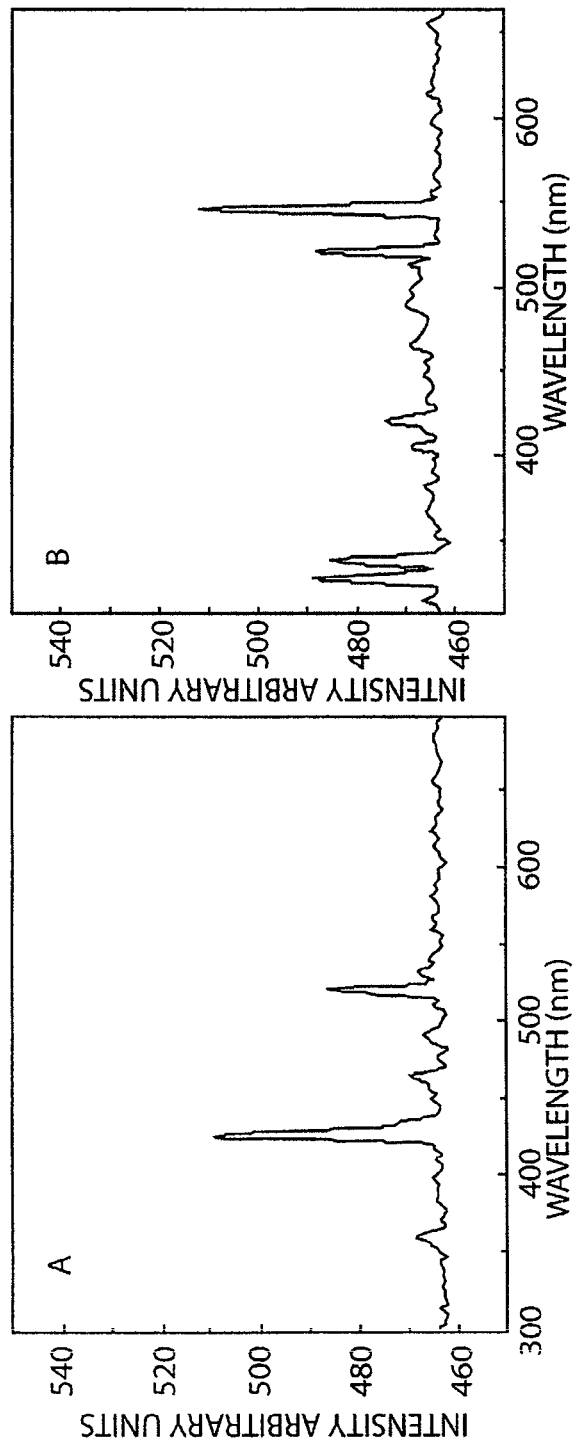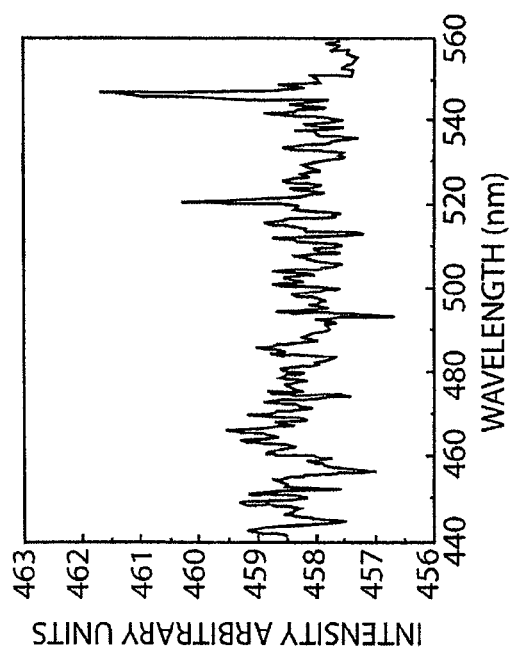

NANOMETER-SCALE ABLATION USING FOCUSED, COHERENT EXTREME ULTRAVIOLET/SOFT X-RAY LIGHT

RELATED CASES

The present patent application is a Divisional of patent application Ser. No. 11/840,898 filed on Aug. 17, 2007, which claimed the benefit of Provisional Patent Application Ser. No. 60/838,959 filed on Aug. 19, 2006, entitled "Advanced EUV Laser And Techniques" by Carmen S. Menoni et al., the disclosure and teachings of which applications are hereby incorporated by reference herein.

STATEMENT REGARDING FEDERAL RIGHTS

This invention was made with government support under the Engineering Research Centers Program of the National Science Foundation under NSF award EEC-0310717, and under Contract No. DE-AC02-05CH11231 awarded to the Lawrence Berkeley National Laboratory by the U.S. Department of Energy. The government has certain rights in the invention.

FIELD OF THE INVENTION

The present invention relates generally to laser ablation of materials and, more particularly, to the use of focused, coherent ultraviolet/soft x-ray light for nanometer scale machining and for analysis of materials.

BACKGROUND OF THE INVENTION

Laser ablation of nanoscale features is of interest for the fabrication of nanodevices and for the development of analytic instruments for sampling materials at nanoscale dimensions. The size of the smallest ablated features is limited principally by the wavelength of the laser emission and by heat diffusion. A number of techniques have been recently developed for producing ablation features with submicrometer size. By taking advantage of the well-defined ablation threshold in materials, craters having sizes ranging from 0.7 to 1.2 µm were achieved in silicon using nanosecond ultraviolet (UV) pulses. Ablation features of the order of 200 nm have been demonstrated using femtosecond laser pulses in the near-infrared, and UV spectral regions. Patterning of yet smaller features has been achieved using the electric field enhancement created at the tip of an atomic force microscope (AFM) by focused femtosecond laser pulses or by using optical fibers to create near-field effects.

Accordingly, it is an object of the present invention to provide an apparatus and method for machining nanoscale features in materials by ablation using extreme ultraviolet/soft x-ray (EUV/SXR) radiation.

Another object of the invention is to provide an apparatus and method for patterning nanoscale features in materials by ablation using high spatial resolution extreme ultraviolet/soft x-ray radiation at wavelengths having small absorption depth in the materials.

Additional objects, advantages and novel features of the invention will be set forth in part in the description that follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus for nanometer-scale ablation of material from the surface of a sample, hereof, includes in combination: a chamber capable of being evacuated; pump means for evacuating the chamber to a chosen pressure; a source of pulsed coherent light having a chosen wavelength in the range between 1 nm and 100 nm, and a chosen fluence, wherein the pulsed light is introduced into the chamber; a Fresnel zone plate disposed within the chamber for receiving the chosen wavelength of light from the source of light, and for focusing the light; and means for positioning the sample in the region of the focused light within the chamber such that the focused light is incident on the surface of the sample, whereby material is removed from the surface of the sample.

In another aspect of the present invention, and in accordance with its objects and purposes, the method for nanometer-scale ablation of material from the surface of a sample, hereof, includes the steps of: directing pulsed coherent light having a chosen wavelength in the range between 1 nm and 100 nm and a chosen fluence onto a Fresnel zone plate disposed in a vacuum chamber at a chosen pressure, such that the light is focused; and positioning the sample in the region of the focused light in the vacuum chamber such that the focused light is incident on the surface of the sample, whereby material is removed from the surface of the sample.

Benefits and advantages of the present invention include, but are not limited to, an apparatus and method for generating holes in materials having diameters less than 200 nm and clean walls, and for permitting analysis of nanometer-sized portions of surfaces.

BRIEF DESCRIPTION OF THE DRAWINGS

The accompanying drawings, which are incorporated in and form a part of the specification, illustrate embodiments of the apparatus of the present invention and, together with the description, serve to explain the principles of the invention. In the drawings:

FIG. 1A is a schematic representation of the side view of one embodiment of the EUV/SXR laser ablation apparatus of the present invention showing the evacuated target chamber of the EUV/SXR laser containing the Fresnel zone plate and the target, while

FIG. 4A is a calculated diffraction pattern at the third-order focal plane, 710 µm from the FZP (dashed curve), and at 7.5 µm away from it at 702.5 µm from the FZP (solid curve), while FIG. 4B shows an AFM image of a typical ablation pattern obtained outside of the focal plane without attenuation.

FIG. 5A shows an AFM image of an 82 nm diameter hole obtained by placing the sample ~7.5 µm away from the third diffraction order focal plane, while FIG. 5B shows the cross section of the hole.

FIG. 6A shows an emission spectrum obtained from a chromium sample averaged over 100 laser pulses using an apparatus similar to that described in FIG. 1B hereof, while FIG. 6B shows an emission spectrum obtained from a silver sample averaged over 100 laser pulses using the same apparatus as that from which the spectrum shown FIG. 6A hereof was generated.

FIG. 7 shows an emission spectrum obtained from a silver sample with a single laser pulse using the same apparatus as that from which the spectrum shown FIG. 6A hereof was generated.

DETAILED DESCRIPTION OF THE INVENTION

Figure 1A:
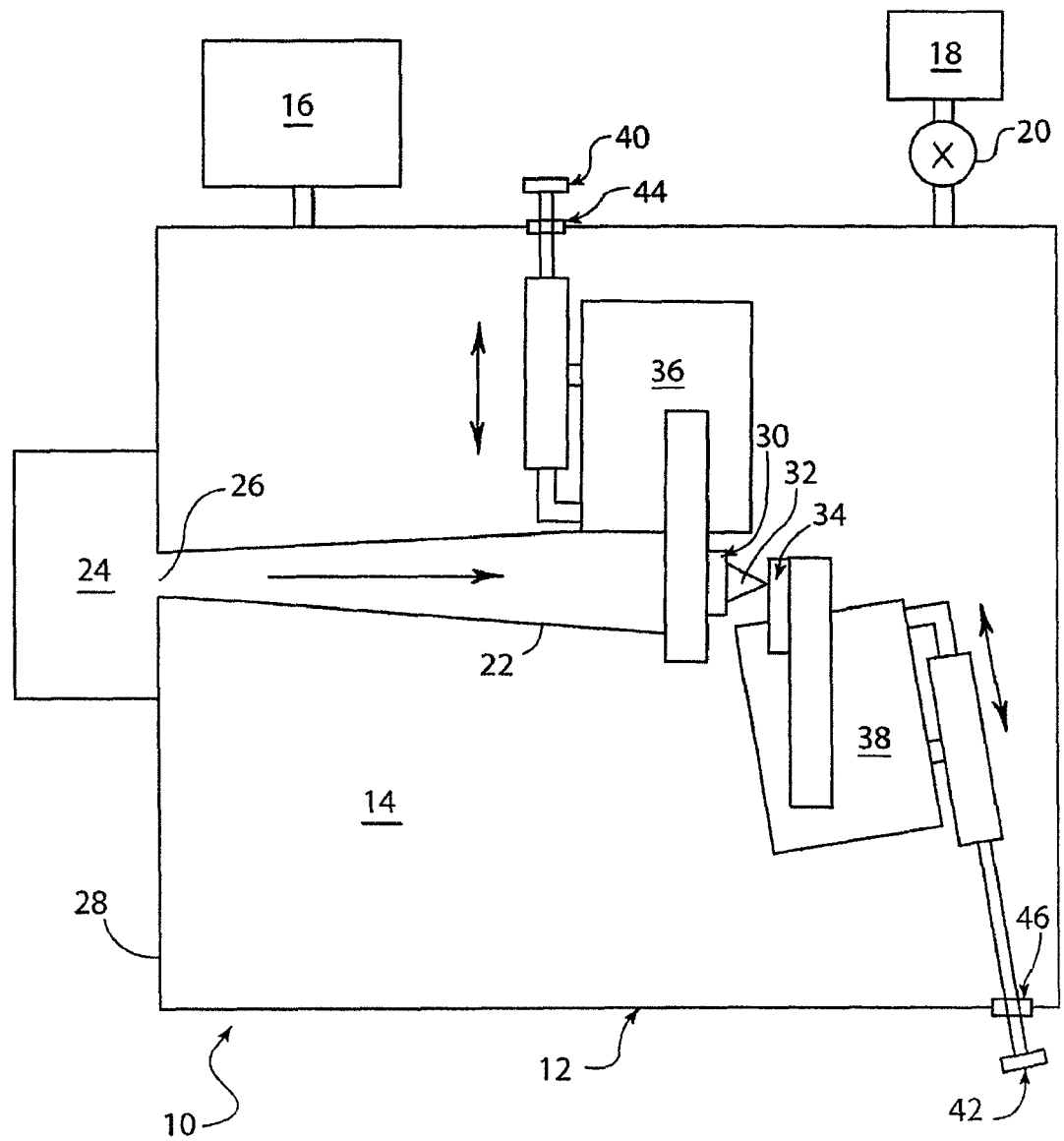

Extreme ultraviolet electromagnetic radiation for the purposes hereof corresponds to wavelengths between about 5 nm and 100 nm, while soft x-ray electromagnetic radiation corresponds to wavelengths between about 1 nm and 5 nm. While the invention is not restricted to this source of coherent extreme ultraviolet/soft x-ray laser light, the capillary discharge x-ray laser used for the EXAMPLES of the present invention is similar to that described in U.S. Pat. No. 7,251,263 for "Capillary Discharge X-Ray Laser" which issued to Jorge J. Rocca on Jul. 31, 2007, hereinafter the '263 patent, the disclosure and teachings of which are hereby incorporated by reference herein. Recently developed table-top size EUV/SXR lasers provide wavelengths between 13 nm and 47 nm (See, e.g., A. Weith et al. in "Continuous High-Repetition-Rate Operation Of Collisional Soft X-Ray Lasers With Solid Targets," Optics Lett. 31, (2006), Y. Wang et al., "Demonstration Of High-Repetition-Rate Tabletop Soft-X-Ray Lasers With Saturated Output Down To 13.9 nm And Gain Down To 10.9 nm," Phys. Rev. A 72, 053807 (2005), and U.S. patent application Ser. No. 11/021,217 for "Increased Laser Output Energy And Average Power At Wavelengths Below 35 nm" by Jorge J. Rocca et al. which was filed on Dec. 23, 2004).

Briefly, the present invention includes the use of EUV/SXR pulsed coherent light from a discharge-pumped EUV/SXR laser for nanoscale ablation and machining by focusing the laser radiation to nanometer-scale dimensions on surfaces of interest with Fresnel zone plate optics. The high intensity generated at the focus is capable of ablating the surface of the material in a single laser pulse, thereby creating craters having nanometer-scale size with clean walls. Focus dimensions of less than 100 nm in diameter can be achieved using the first and higher order foci of the zone plate lens. The present invention also includes machining of surfaces by displacing the sample in a controlled manner along directions parallel to the surface of the sample and using a multilayer coated, actuator-driven micro-positioning controlled mirror to define the ablated pattern. Nanoscale patterns may be created in a variety of materials: polymers, metals, semiconductors such as silicon, as examples. The invention can also be used to functionalize polymers or biological materials.

Spatial resolution of the apparatus derives from the short wavelengths of the laser source, and the characteristics of the Fresnel zone plate used to focus the laser output. The ablation process of the present invention is performed at reduced pressures. By adding reactive gases such as chlorine in chosen amounts to the vacuum chamber, nanoscale ablation and nanoscale machining may be chemically assisted.

The present invention may also be used for surface diagnostics having high spatial resolution by analyzing the characteristics of the plasma created in the ablation process using light or mass spectroscopy, as examples.

As will be described in detail in the EXAMPLES set forth hereinbelow, sub-100 nm nanoscale holes have been generated by ablation using a focused soft x-ray laser beam. Ablation craters having clean walls were created in poly-methyl methacrylate (PMMA) by focusing the 46.9 nm wavelength output from the capillary discharge laser similar to that described in the '263 patent, using a free-standing Fresnel Zone Plate (FZP). The smallest craters, 82 nm in diameter, were obtained by placing the sample near the third order focal plane of the FZP. The high spatial resolution and the small depth of absorption of the 46.9 nm wavelength light for most materials are exploited for nanoscale patterning applications. When combined with spectroscopic tools, nanoscale ablation may enable surface nanoscale probes based on techniques such as laser induced breakdown spectroscopy (LIBS).

Reference will now be made in detail to the present embodiments of the present invention, examples of which are illustrated in the accompanying drawings. In the drawings, similar or identical structure is identified using identical callouts. Turning now to the FIGURES, FIG. 1A is a schematic representation of a side view of one embodiment of the nanoscale ablation apparatus, 10, of the present invention. Shown are chamber, 12, having interior volume, 14, which may be located in a similar position to chamber 56 relative to discharge capillary 13 in FIG. 1A of the '263 patent. Pump, 16, is used to evacuate chamber 12 to a chosen pressure, while gas source, 18, is used to introduce gases into volume 14 of chamber 12 through valve, 20. In the situation where an EUV/SXR laser of the type described in the '263 patent is employed, chamber 12 would be differentially pumped by pump 16.

EUV/SXR laser radiation, 22, from an EUV/SXR laser, 24, enters chamber 12 through hole, 26, in the wall, 28, thereof, and impinges on free-standing Fresnel zone plate, 30, which focuses the radiation, 32, onto the surface of sample, 34. XYZ translation stages, 36 and 38, are used to position Fresnel zone plate 30 and sample 34, respectively. Translations stages 36 and 38 may be operated by screw devices 40 and 42 which extend through wall 28 by means of vacuum feed-throughs, 44 and 46, respectively, or may be controlled electronically from the outside of chamber 12 (not shown in FIG. 1A).

Figure 1B:
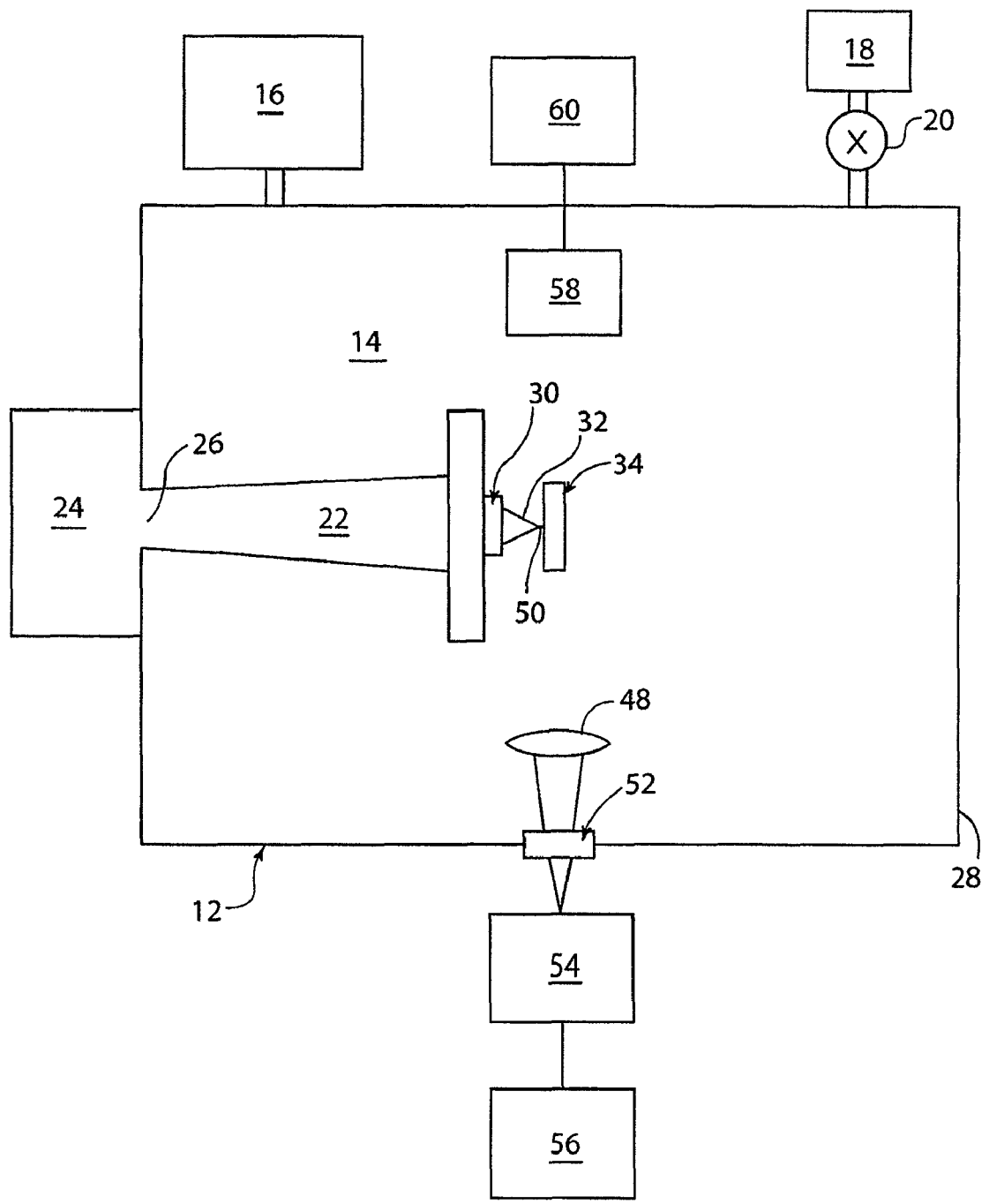
FIG. 1B is a schematic representation of the apparatus shown in FIG. 1A hereof showing light-collection apparatus and a spectrometer for spectroscopic analysis of light emitted as a result of focused coherent EUV/SXR laser radiation impinging on the surface of the target.

FIG. 1B is a schematic representation of a side view of the apparatus of the present invention shown in FIG. 1A hereof, showing light collection apparatus, 48, for collecting light emerging in the vicinity of the plasma formed at focus, 50, of radiation 22 on sample 34, and for directing and focusing the light through window, 52, in wall 28 of chamber 12 and into spectrometer, 54, for spectral analysis, and identification using computer, 56. Shown also are mass spectrometer, 58, and computer, 60, for analyzing atomic and molecular ions and other species emerging from the plasma formed at focus 50 of radiation 22 on sample 34.

Having generally described the invention, the following EXAMPLES provide more specific information.

EXAMPLE 1

Using a laser similar to that described in the '263 patent which uses a fast electrical discharge in an argon filled capillary tube to produce a population inversion and amplification in the 46.9 nm transition of Ne-like ions (26.4 eV photon energy) as laser source 24, an 18 cm long capillary generated ~0.1 mJ pulses 22 having =1.2 ns duration with a repetition rate of up to 10 Hz. Free-standing FZP 30 was manufactured by electron-beam lithography, in accordance with the teachings of E. H. Anderson in IEEE J. Quantum Electron. 42, 27 (2006), into a 200 nm thick nickel film attached to a silicon frame. The FZP had a 0.5 mm diameter, an outermost zone width of 200 nm, and a numerical aperture, NA=0.12. Its Rayleigh-like spatial resolution in the first diffraction order focus at 46.9 nm wavelength is ~240 nm. The FZP was mounted on XYZ translation stage 36 and positioned at ~1.8 m from laser exit 26, where the laser beam diameter is ~16 mm. A laser pulse energy of 10 µJ was measured through a 6 mm pinhole placed at the location of the FZP using a vacuum photodiode. Considering that the FZP aperture was 0.5 mm in diameter, only a ~1/1000 portion of the laser beam is effectively used. When also accounting for the first order diffraction efficiency of ~10%, the energy delivered to the surface of sample 34 is estimated to be ~7 nJ. The fluence onto the sample was controlled by introducing argon gas from source 18 into vacuum chamber 12 as a means of attenuating the laser beam following photoionization of the argon atoms by the 22.4 eV photons. It should be mentioned that gases having an ionization potential lower than 26.4 eV may be used for this purpose.

Sample 34 consisted of a 500-nm layer of poly(methyl methacrylate) (PMMA-MicroChem, 950,000 molecular weight) spin-coated onto a Si wafer. The sample was positioned perpendicular to the incident EUV/SXR laser beam 22, whereas translation stage 38 was tilted at an angle of ~0.57° with respect to the sample's surface to permit precise positioning of the sample with respect to the zone plate focal plane (first order depth of focus ~3 µm). In this manner, 100 µm transverse displacement of the sample corresponds to a 1 µm displacement along the beam axis. The ablation craters produced by the $\lambda$=46.9 nm laser beam were analyzed with a VEECO NanoScope III Atomic Force Microscope (AFM) used in tapping mode with a 10 nm radius, 30° cone angle cantilever tip (MicroMasch, NSC16).

Figure 2:
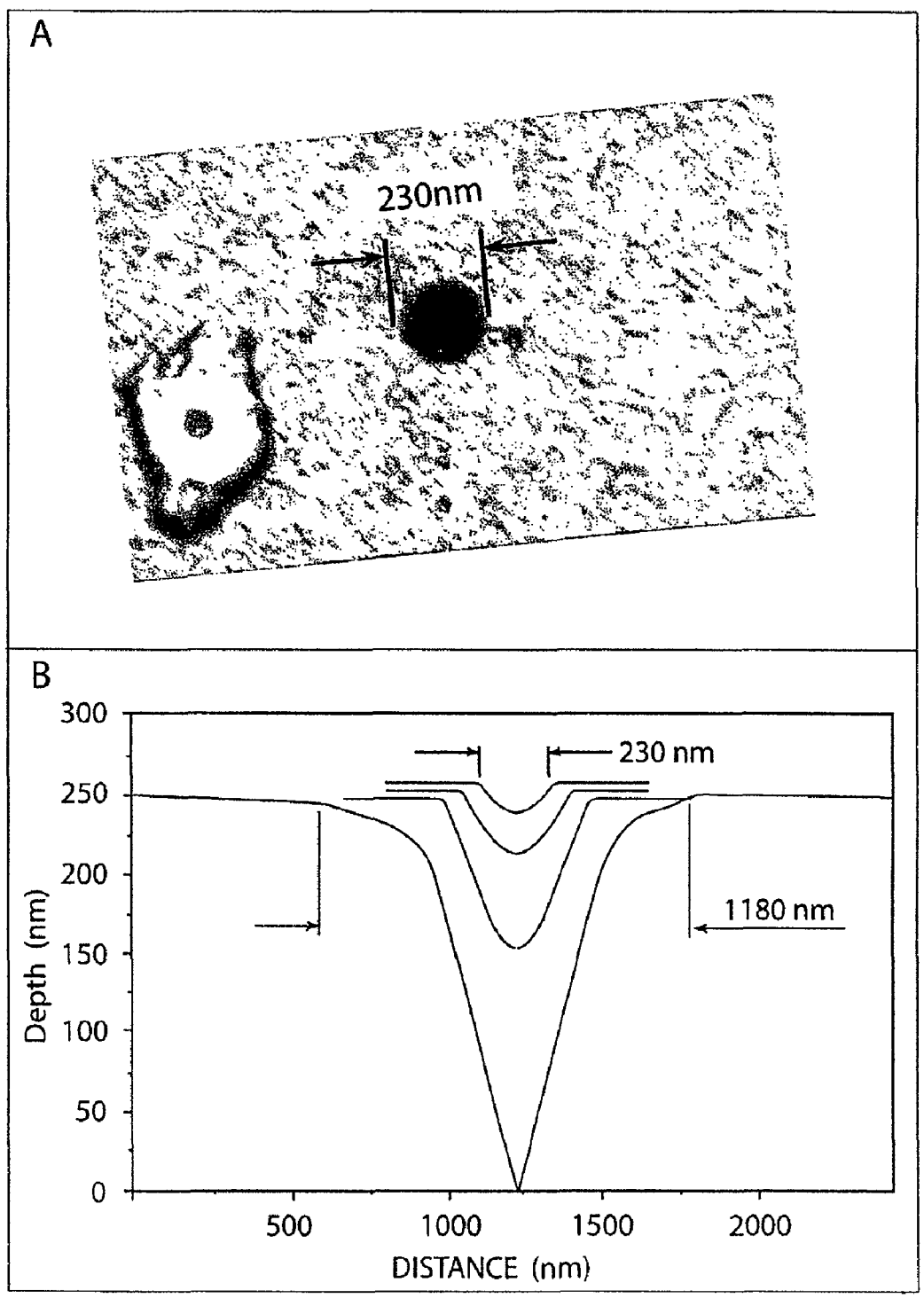
FIG. 2A is an AFM image of the ablation crater produced in PMMA using first diffraction order focusing of a 46.9 nm wavelength laser beam and 36× attenuation.
FIG. 2B shows cross sections of AFM images of ablated craters obtained with attenuation factors of 1, 6, 14, and 36×.

FIG. 2(*a*) is an AFM image of an ablation crater obtained positioning the sample at the FZP first diffraction order focal plane. This ablation crater and all others shown in these EXAMPLES were produced with a single laser pulse. The crater was obtained attenuating the beam by ~36× introducing 110 mTorr of argon into chamber 12. Attenuation of the laser beam resulted in a reduction of the crater diameter and depth (FIG. 2(*b*)). The 230 nm diameter of the craters ablated with the attenuated laser beam approximately matches the first order diffraction spatial resolution of the FZP. The depth of the craters ablated without attenuation was 250 nm which is significantly larger than the 19 nm attenuation length of the 46.9 nm light in PMMA [See, e.g., B. L. Henke et al., At. Data Nucl. Data Tables 54, 181 (1993)]. The created plasma with an estimated temperature of $T_e$=1-3 eV, had an acoustic velocity that is ~10× larger than that necessary to clear the hole within the laser pulse duration. The pulse-to-pulse reproducibility of the ablation was found to be good, the edges of the craters being abrupt and the walls being smooth. The generation of high quality ablated surfaces is assisted by the strong localization of the absorbed energy; that is, the attenuation and thermal diffusion lengths here are very short, and by the prevalence of chain scissions at short wavelengths. [See, e.g., B. L. Henke et al., supra.].

EXAMPLE 2

Figure 3:
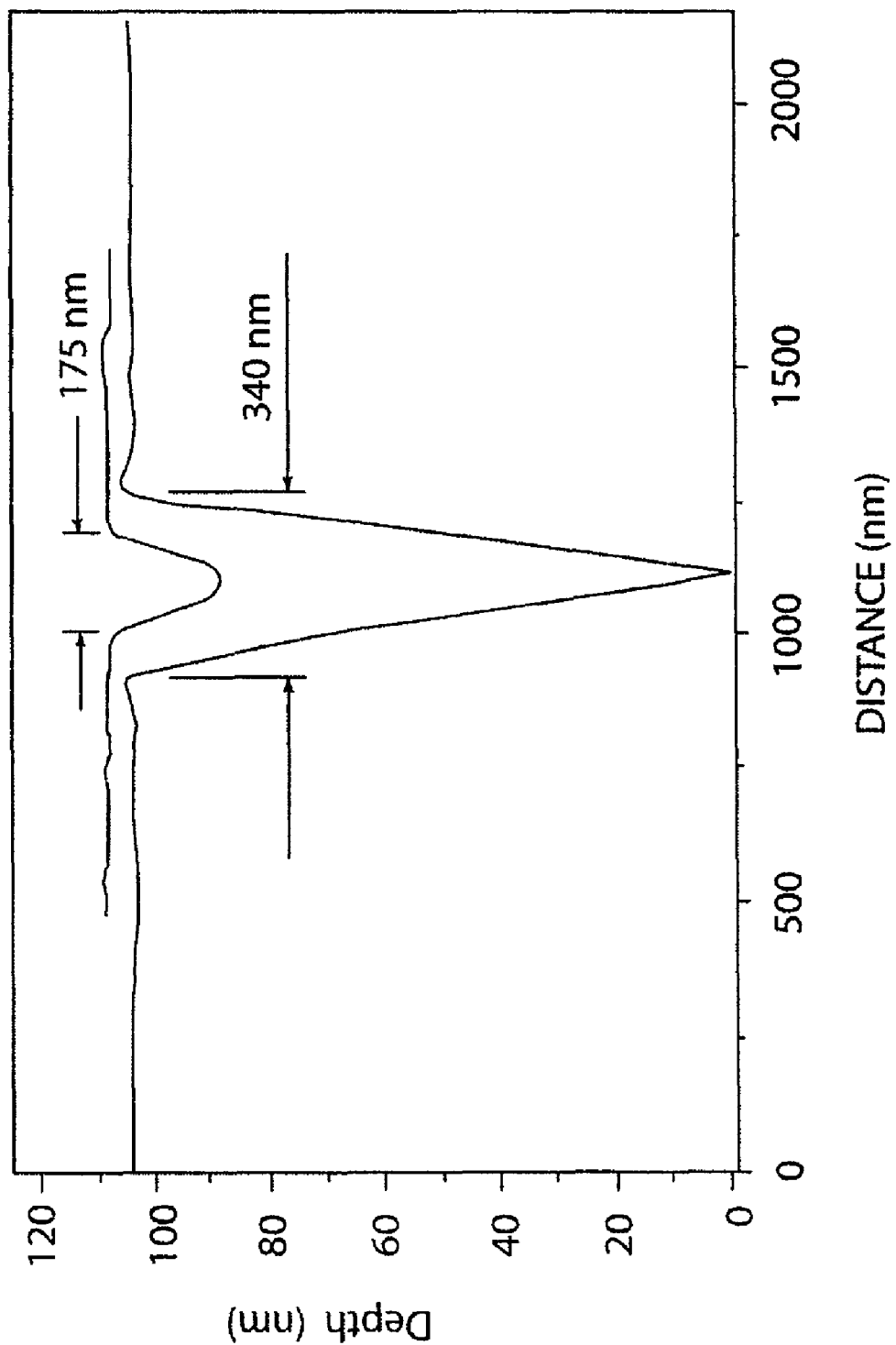
FIG. 3 shows cross sections of the ablation craters obtained with the third-order focus of the zone plate and attenuation factors of 1× (lower trace) and 5× (upper trace).
Figure 4:
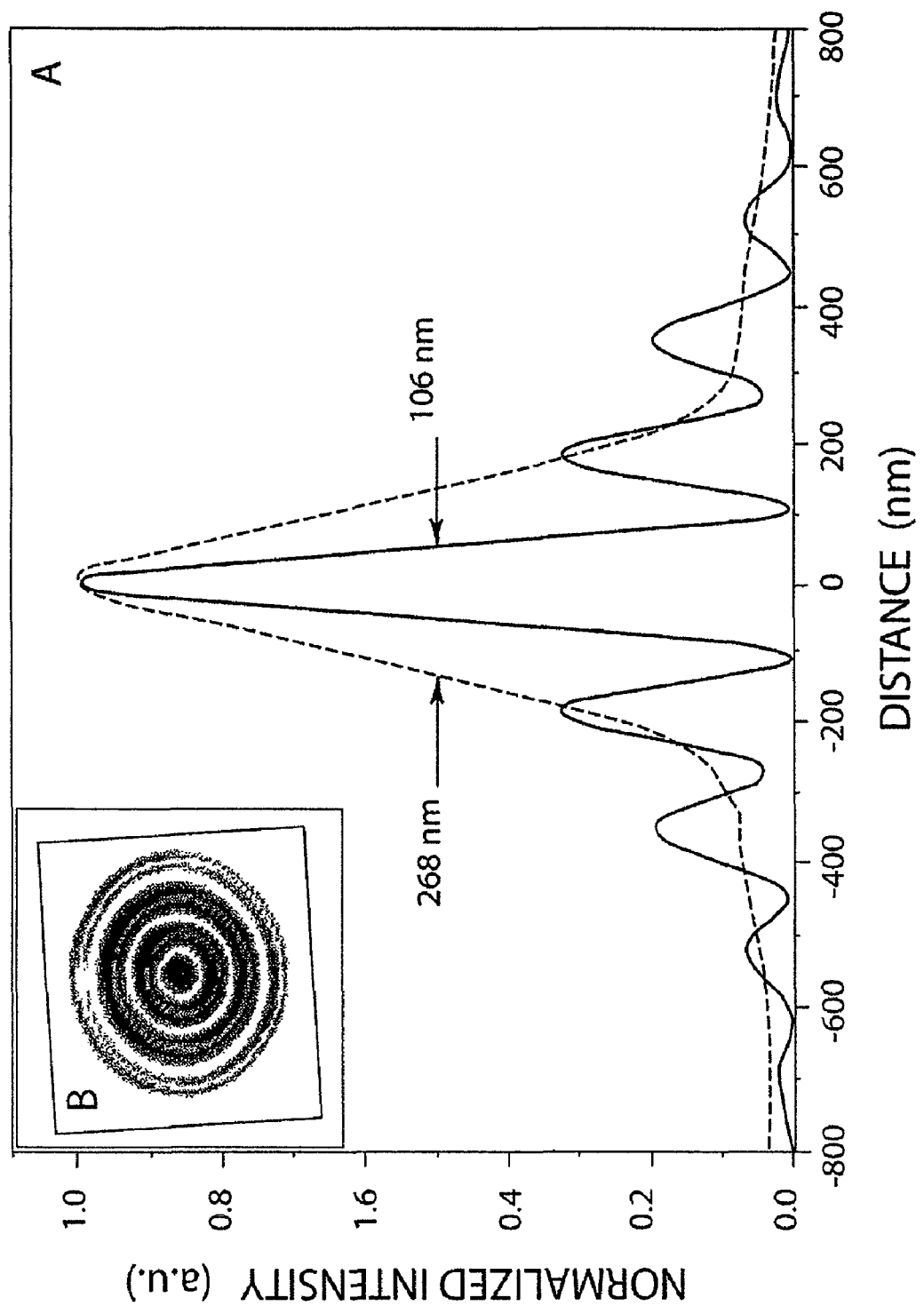

Smaller craters can in principle be obtained using the tighter third order focus of the zone plate. FIG. 3 shows cross sections of the ablation holes obtained with the third diffraction order, which contains only about ~1/10 of the pulse energy in the first order focus. The hole created without attenuation had a diameter of 330 nm and a depth of ~100 nm, while the crater formed with the laser beam attenuated by ~5× was 170 nm wide and 16 nm deep. As in the case of first order focusing, the craters had clean walls. However, the diameters of the craters were significantly larger than might be expected from the resolution of a FZP in third-order operation (~80 nm). It is believed by the present inventors that the fact that the FZP used in the experiment was corrected for aberrations in the first order focus, but not in third order, generated this effect. Thus, the uncorrected aberration caused the third-order diffraction focal spot to be wider. This was confirmed simulating the intensity distribution at the third order focal plane using the Rayleigh-Sommerfeld diffraction integral [See, e.g., Q. Cao and J. Jahns, J. Opt. Soc. Am. A 21, 561 (2004).] which resulted in a peak with FWHM of ~270 nm (FIG. 4A). The simulation also showed that a much narrower intensity peak of ~100 nm FWHM surrounded by concentric rings of decreasing intensity can be obtained at locations several micrometers away from the focal plane (for example, locating the sample ~7.5 µm closer to the Fresnel zone plate than the third-order focal plane of the zone plate), and attenuating the intensity of the rings to values below the ablation threshold, the narrow central peak should produce smaller holes. FIG. 4B shows an AFM image of a typical ablation pattern obtained outside of the focal plane without attenuation.

Figure 5:
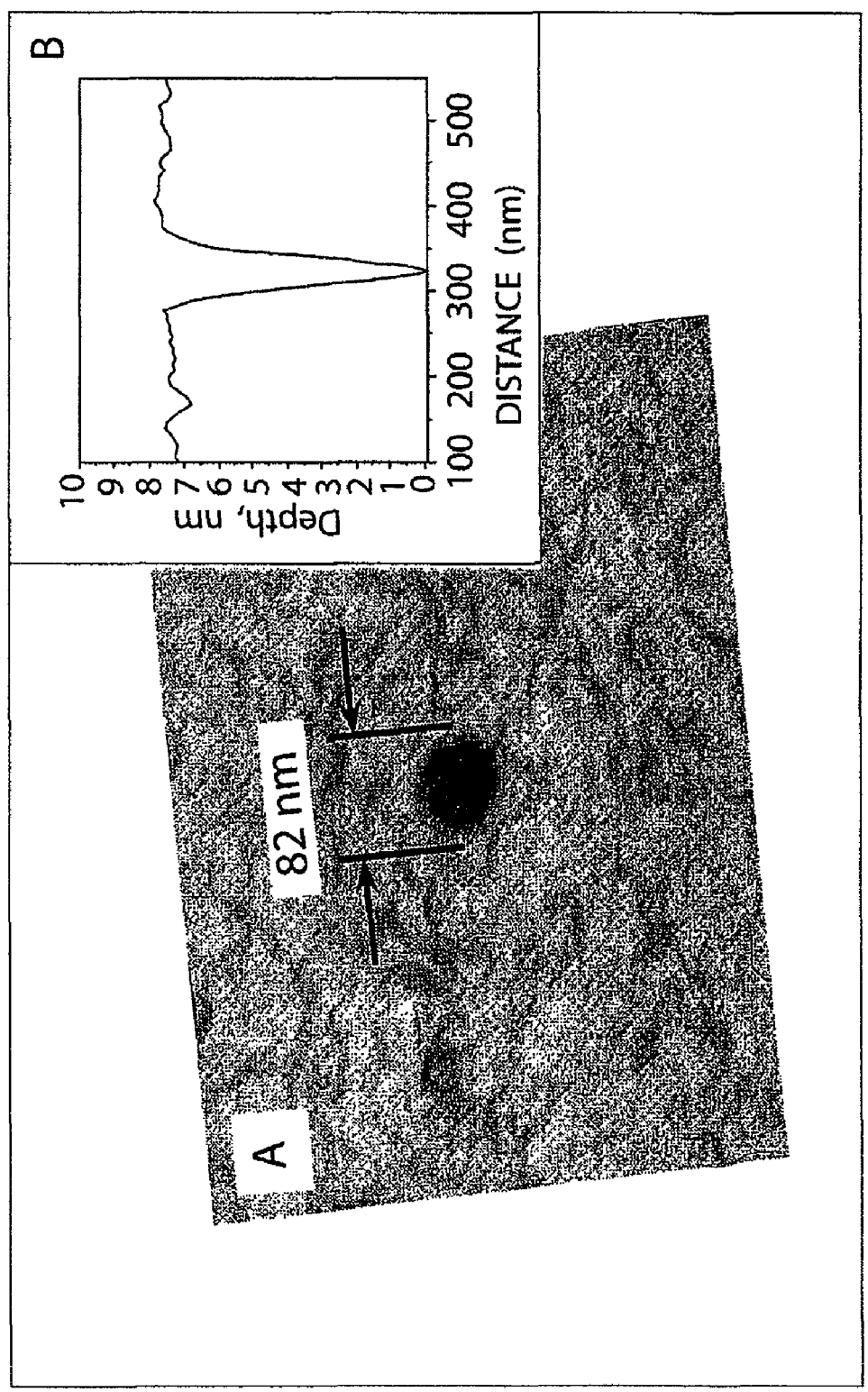

Holes having a diameter of ~82 nm and a depth of ~8 nm were obtained by placing the sample at ~7 µm away from the third order focal plane (FIG. 5A) and attenuating the beam by a factor of ~5×. FIG. 5B shows the cross section of the hole. The use of a FZP with smaller outer zone width may produce holes having even smaller dimensions. AFM images of multiple holes generated in accordance with the teachings of the present invention have shown good pulse-to-pulse reproducibility.

Shorter duration coherent extreme ultraviolet light pulses having picosecond or femtosecond duration as generated from, for example, a transient collisional soft x-ray laser (See, e.g., Y. Wang et al., supra.), or by high harmonic generation, can reduce heat diffusion during the irradiation pulse, thereby assisting in the generation of smaller craters in materials having high heat conductivity.

EXAMPLE 3

FIG. 6A shows an emission spectrum obtained from a chromium sample averaged over 100 laser pulses using an apparatus similar to that described in FIG. 1B hereof, while FIG. 6B shows an emission spectrum obtained from a silver sample averaged over 100 laser pulses using the same apparatus as that from which the spectrum shown FIG. 6A hereof was generated. Light from the plasma was collected using an optical fiber having NA=0.3 (not shown in FIG. 1B). The 0.5 m long fiber was inside chamber 12. A vacuum feedthrough connected the optical fiber interior to the chamber with a 1 m long optical fiber outside of chamber 12 which was imaged onto the slit of spectrometer 54 using a lens having a focal length of 5 cm. The samples were silicon wafers coated with a greater than 300 nm thick film of chromium or silver. It should be pointed out that a larger laser fluence was applied to the sample than that used for generating the holes shown in FIGS. 2A and 5A hereof. It should also be mentioned that further heating the plasma generated in the ablation process using a laser or a microwave source, as examples, may increase the light emitted from the plasma.

FIG. 7 shows an emission spectrum obtained from a silver sample with a single laser pulse using the same apparatus as that from which the spectrum shown in FIG. 6A hereof was generated, where again a larger laser fluence was applied to the sample than that used for generating the holes shown in FIGS. 2A and 5A hereof.

Another configuration of the plasma analysis apparatus is shown in FIG. 1B, where light collecting apparatus 48 includes a lens located about 8.5 in. from the plasma, and images the plasma (1:1) onto spectrometer 54 through glass window 52. The total length from the plasma to the spectrometer slit was approximately 19 in.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for nanometer-scale ablation of material from the surface of a sample, comprising the steps of:
   directing pulsed coherent light having a chosen wavelength in the range between 1 nm and 100 nm and a chosen intensity onto a Fresnel zone plate disposed in a vacuum chamber below atmospheric pressure, such that the light is focused; and
   positioning the sample closer to the Fresnel zone plate than the third-order focal plane thereof in the vacuum chamber such that the light is focused on the surface of the sample, whereby material is removed from the surface of the sample.

2. The method described in claim 1, wherein the source of coherent light comprises an extreme ultraviolet/soft x-ray laser.

3. The method as described in claim 2, wherein the extreme ultraviolet/soft x-ray laser produces light pulses having picosecond or femtosecond duration.

4. The method described in claim 2, wherein the source of laser radiation comprises a capillary discharge x-ray laser, and wherein the chosen wavelength comprises 46.9 nm from the 26.4 eV transition of neon-like Ar ions.

5. The method described in claim 4, wherein the chosen intensity of the source of pulsed light is controlled by passing the pulsed light through atoms having a chosen pressure and an ionization potential less than 26.4 eV.

6. The method described in claim 1, wherein the chosen wavelength has small absorption depth in the material in the surface of the sample.

7. The method described in claim 1, further comprising the step of adding reactive species to the vacuum chamber such that the ablation is chemically assisted.

8. The method described in claim 1, further comprising the step of spectroscopically analyzing light from the ablation.

9. The method described in claim 1, further comprising the step of mass analyzing species emerging from the surface of the sample as a result of the ablation.

10. The method as described in claim 1, further comprising the step of adjusting the chosen intensity of the pulsed coherent light such that lower intensity concentric rings surrounding a central intensity peak of said pulsed coherent light resulting from focusing by the Fresnel zone plate are incapable of ablating the sample.

* * * * *